(12) United States Patent
Wiesemann et al.

(10) Patent No.: US 7,374,150 B2
(45) Date of Patent: May 20, 2008

(54) ERGONOMIC FISH TAPE

(75) Inventors: David L. Wiesemann, Pewaukee, WI (US); David A. Huebschen, Menomonee Falls, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/566,930

(22) PCT Filed: Aug. 6, 2004

(86) PCT No.: PCT/US2004/025510

§ 371 (c)(1),
(2), (4) Date: Oct. 25, 2006

(87) PCT Pub. No.: WO2005/013668

PCT Pub. Date: Feb. 17, 2005

(65) Prior Publication Data

US 2007/0187659 A1 Aug. 16, 2007

Related U.S. Application Data

(60) Provisional application No. 60/493,819, filed on Aug. 8, 2003.

(51) Int. Cl.
*H02G 1/08* (2006.01)
(52) U.S. Cl. .................. 254/134.3 FT; 254/134.3 R; 242/390.8
(58) Field of Classification Search ....... 254/134.3 FT, 254/134.3 R; 242/390.8, 394.1, 390.9
See application file for complete search history.

(56) References Cited

U.S. PATENT DOCUMENTS

| 2,743,884 | A | * | 5/1956 | Briggs ........................ 242/386 |
| 4,573,829 | A | * | 3/1986 | Keene et al. ................ 405/157 |
| 5,588,613 | A | * | 12/1996 | Nagy .......................... 242/395 |
| 5,810,277 | A | * | 9/1998 | Cielker et al. .............. 242/395 |
| 6,361,021 | B1 | * | 3/2002 | Brennan ............. 254/134.3 FT |
| 6,416,040 | B1 |   | 7/2002 | Bergman |
| 6,513,791 | B1 | * | 2/2003 | Yates ................. 254/134.3 FT |
| 6,722,603 | B1 | * | 4/2004 | Atencio ................... 242/390.8 |
| 7,044,415 | B2 | * | 5/2006 | Wiesemann et al. ..... 242/405.3 |
| 2007/0187659 | A1 | * | 8/2007 | Wiesemann et al. ......... 254/134.3 FT |

OTHER PUBLICATIONS

International Search Report and Written Opinion Under Date of Mailing of Jan. 11, 2006, in connection with international Patent Application No. PCT/US2004/025510.

* cited by examiner

*Primary Examiner*—Lee D Wilson
(74) *Attorney, Agent, or Firm*—Quarless & Brady LLP

(57) ABSTRACT

A fish tape reel has an ergonomic pistol grip and ergonomic hand grips at an inner periphery of a hollow housing. Fish tape is wound into the housing cavity by rotating the housing with respect to the pistol grip. This can be done manually by grasping the interior handle(s) or using a ratcheted winder that fits into the housing opening and has a lever handle for ratcheting the housing. The reel is held with the housing beneath the pistol grip which has a retainer shoe slidably sandwiched between halves of the housing. The pistol grip is positioned behind a vertical center line of the reel so that the weight of the reel is balanced in a neutral position in which the pistol grip can be grasped with the user's wrist being essentially straight and horizontal. A method of assembling the reel is also disclosed in which the fish tape is attached and wound after the housing is assembled.

25 Claims, 10 Drawing Sheets

FIG. 5
FIG. 6
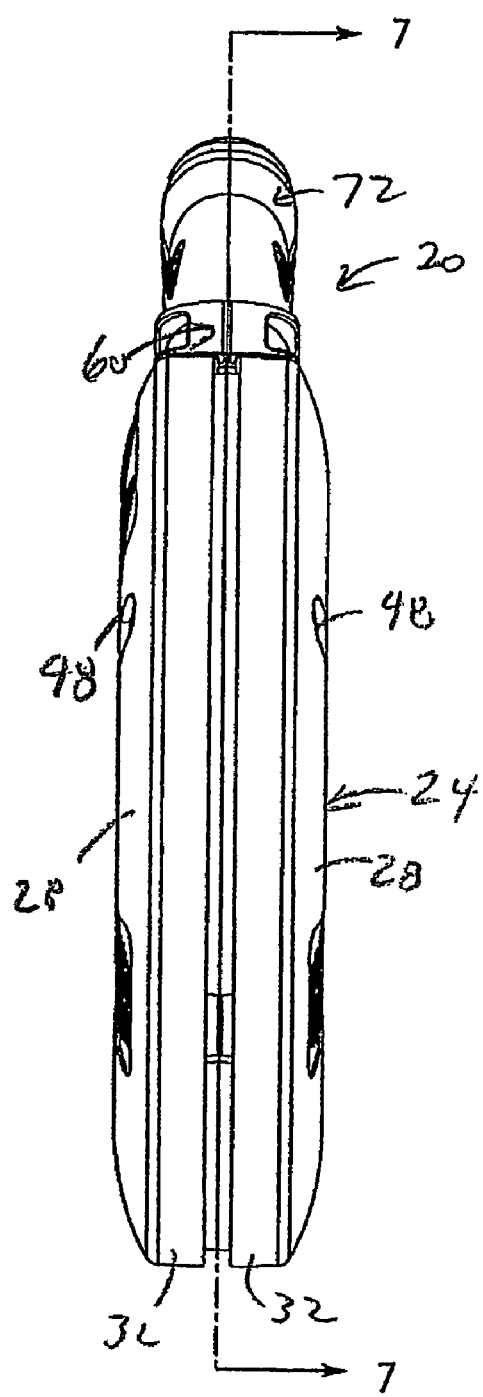
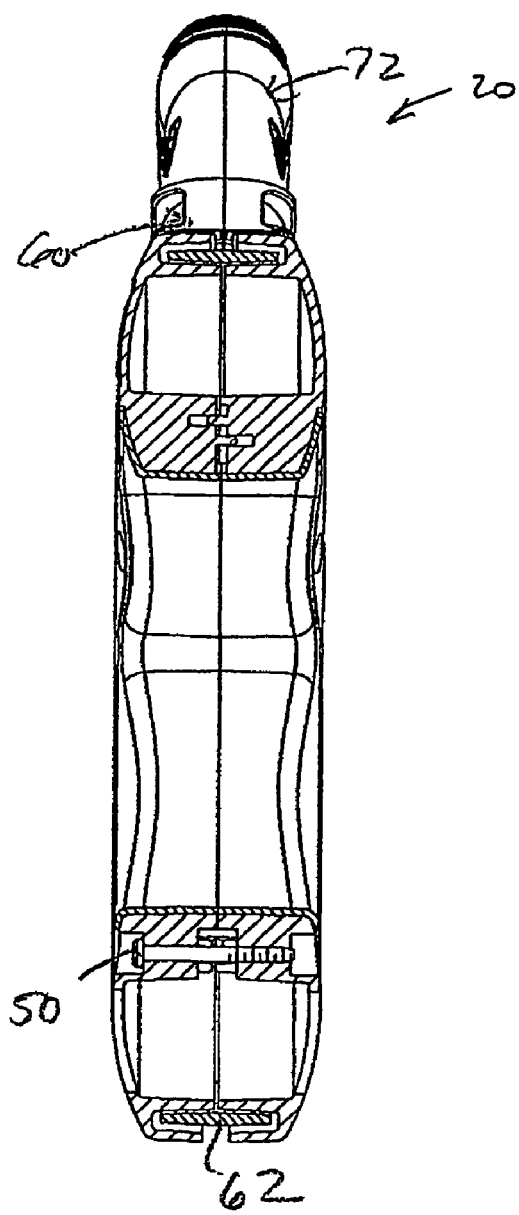

ERGONOMIC FISH TAPE

CROSS-REFERENCE TO RELATED APPLICATION

This application claims benefit to U.S. Provisional Application No. 60/493,819, filed on Aug. 8, 2003.

STATEMENT OF FEDERALLY SPONSORED RESEARCH OR DEVELOPMENT

Not applicable.

BACKGROUND OF THE INVENTION

1. Technical Field

The present invention relates to fish tapes of the type used by electricians to pull wire through conduit or other spaces, and more particularly to the fish tape reel assembly.

2. Description of the Related Art

A fish tape is a stiff but bendable wire, flexible rod or flat tape typically used to install wire in conduit, through existing walls, or other tight spaces. Because typical electrical wire is very flexible, pushing it through long lengths of conduit is virtually impossible. Pulling wire along the desired path is much more effective. In order to pull the wire, a fish tape, being more rigid than electrical wire, is first pushed along the desired path. Once an end of the fish tape reaches the end of the desired path, the electrical wire is attached to the fish tape end, and the fish tape is retrieved which pulls the wire with it.

The fish tape is typically coiled inside of a reel assembly. For example U.S. Pat. No. 4,092,780 has a generally annular tape receiving chamber bounded at its periphery by a pair of opposed lips, which separate to permit winding and unwinding of the fish tape in the chamber. A handle having a tape passage is mounted between the lips, which provides passage of the tape out of and into the receiving chamber. This reel arrangement makes it somewhat difficult to wind and unwind the tape. Given the relative rigid and springy characteristics of the fish tape, coiling the fish tape can require significant force and can be time consuming and frustrating, particularly if the tape binds inside of the reel. Moreover, initial assembly or reattachment of the fish tape to the reel may require the reel to be disassembled in order to anchor one end of the tape to an interior wall. And, once the tape coiled in the chamber the reel must be assembled (or reassembled) without the coil coming undone.

U.S. Pat. No. 6,224,038 provides a solution to the winding and assembly difficulties associated with conventional fish tape reels, as in the above mentioned patent. In this patent, the fish tape is contained in a cassette that loads easily into the main body of the reel. The cassette has its own handle for rotating the cassette relative to the reel body and thereby wind and unwind the tape. While this design provides significant benefits over other conventional fish tape reels, it lack ergonomic features that make it comfortable to operate.

One common problem with conventional fish tape reels is that the handle, as in U.S. Des. Pat. No. D408,749, is ordinarily a carrying handle for transporting the reel to and from a job site, for example, rather than being something to grip and brace the reel when unwinding, and especially, when winding the fish tape.

U.S. Pat. No. 6,016,609 discloses a purportedly ergonomic fish tape reel with a "pistol grip" handle. The pistol grip handle is beneficial because it permits the user to grasp the reel during the winding and unwinding processes with the user's wrist generally straight and in line with the forearm, thereby reducing strain on the user's wrist. However, the disclosed reel coils the fish tape in a cavity located horizontally behind the handle such that the reel would tend to cock back under the force of gravity and forces generated during the winding and unwinding processes such that user's wrist will have to overcome these forces, thereby straining the user's wrist.

U.S. Pat. No. 2,743,884 discloses a different approach to aiding the user in the winding process. In particular, this patent discloses a threader element that fits in the chamber between the opposite sides of the reel. The threader has an elongated body with a passageway through which the fish tape feeds into and out of the reel and a forward leaning handle extending up from the body. The threader is held fixed by the user and the rest of the reel is rotated by hand to wind the fish tape. The threader extends as a chord across an upper interior part of the reel diameter. By virtue of the force of gravity moving the reel downward and the spring force of the fish tape biasing the threader upward, the threader will assume this position during use almost invariably, with only slight difference in relative position. This location, in which the handle of the threader is positioned at a front side of the reel, is disadvantageous because the weight of the reel will tend to cause the wrist to cock backward, especially when winding the fish tape.

U.S. Pat. No. 6,416,040 discloses a fish tape device with a vertically oriented handle on a rear side of the reel assembly, with the tape dispensed through an opening on the other side of the reel assembly. This device is adapted with cam members for gripping and pulling, as when retrieving a wire, fish tape that was previously unwound from the reel assembly. This handle would cock the user's wrist forward and downward in use in order to support the reel assembly.

SUMMARY OF THE INVENTION

The present invention is a fish tape device with improved ergonomics and features designed to facilitate winding the fish tape onto the reel assembly.

In particular, the present invention provides a fish tape reel assembly disposed about a center axis and along first and second sides of a center line intersecting and extending perpendicularly to the center axis. A housing defines a cavity concentric about the center axis and disposed between an outer periphery of the housing and inner periphery of the housing, which defines a central opening through which the center axis extends. A handle member has a retainer shoe captured within the housing so as to be rotatable about the center axis with respect to the housing. The handle member defines an exit aperture at the first side of the center line in communication with the cavity such that fish tape can be wound within the cavity, with one end fixed to the housing and an opposite end extending outside of the housing. The pistol grip is located at the second side of the center line and oriented so as to balance the weight of the assembly with the user's wrist in a neutral position, generally straight and horizontal. The fish tape is wound within the cavity by rotating the housing about the center axis with respect to the handle member.

The location of the pistol grip allows the reel assembly housing (and fish tape) to be suspended beneath the pistol grip in an orientation, under its own weight, for grasping the pistol grip with an essentially straight wrist.

In preferred forms, the pistol grip extends at least about three inches to a free end not connected to the housing at an angle less then ninety degrees from a tangent line intersecting the pistol grip and the housing. The pistol grip defines a convex palm rest and a convex finger grip both of which have raised ribs. The pistol grip also has a contoured head at the free end for engaging a user's index finger to inhibit the grip from sliding through the user's hand.

In other preferred forms, the housing defines a circular peripheral groove radially outside of the cavity in which the retainer shoe, preferably forming an axially split band or more preferably a continuous arcuate band, is disposed such that it is isolated from the fish tape other than at the exit aperture. The housing defines a convex outer surface between the inner and outer peripheries and is comprised of two annular housing parts connected by threaded fasteners. The inner periphery of the housing defines at least one, and preferably three spaced apart 120 degrees, hand grip(s) adjacent the central opening having a convex shape at least about three inches long and having raised ribs. The inner periphery also defines one or more hand stops adjacent the hand grip(s) for physical abutment with one's hand during winding.

In another aspect the invention provides a fish tape apparatus which includes a reel assembly as described above and a winder mechanism. The winder has a hub adapted to engage the inner periphery of the housing and has a handle adapted to rotate the hub and thereby the housing about the center axis relative to the reel assembly handle member for winding the fish tape within the cavity.

In preferred forms, the winder includes a clutch such that rotating the winder handle in one direction rotates the housing with respect to its handle member to wind the fish tape, and rotating the winder handle in an opposite direction does not cause the housing to rotate relative to the handle member. The clutch is preferably a conventional drawn cup roller clutch available commercially. Also, the winder is removably mounted to the inner periphery of the reel assembly housing. Even more preferably the winder hub can be spaced from at least one interior grip surface of the inner periphery of the reel assembly housing so that the housing can also be rotated by grasping the grip.

Another aspect of the invention provides a method of assembling a fish tape reel assembly. The method includes joining two annular housing parts with a handle member therebetween. The handle member has a spacer abutting surfaces of the housing parts to provide a gap in communication with an exit aperture of the handle member and the cavity defined when the housing parts are joined. With these components fully assembled, the method continues by feeding an anchor end of a fish tape through the exit aperture and between the housing parts. The anchor end of the fish tape is then attached to a pin element in the housing and the fish tape is wound within the cavity.

In preferred forms, at least one of the housing parts includes a window proximate to the pin element for visual inspection during attachment of the fish tape to the pin element. Also, the pin element is preferably a threaded fastener used to join the housing parts and the spacer is severed by the housing parts during the winding operation.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

BRIEF DESCRIPTION OF THE DRAWINGS

FIG. 5 is an end view thereof;

FIG. 6 is an end sectional view taken along line 6-6 of FIG. 4;

FIG. 10 is an end plan view thereof;

DETAILED DESCRIPTION OF THE PREFERRED EMBODIMENT

Figure 1:
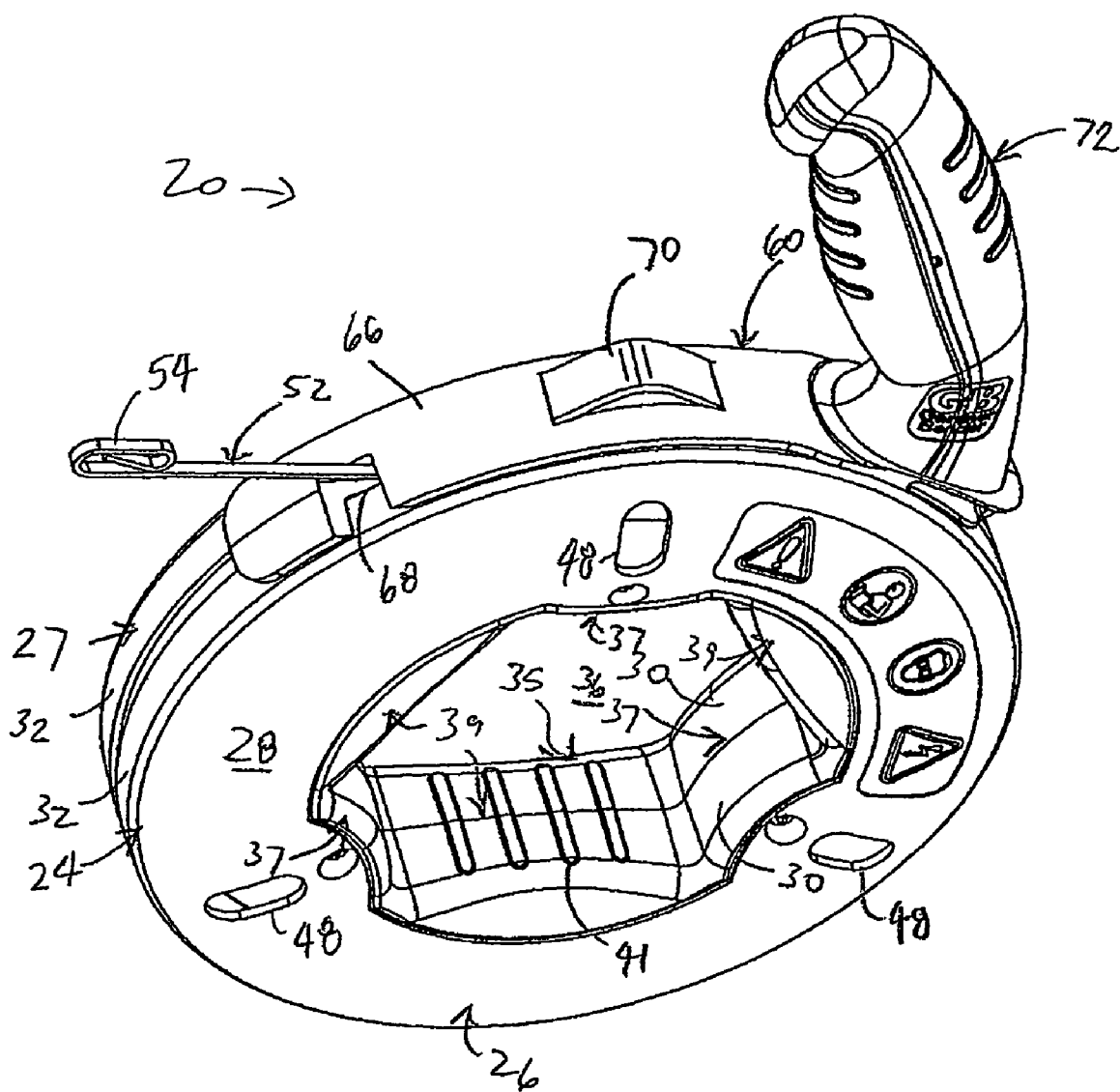
FIG. 1 is a front perspective view of a fish tape reel assembly according to the present invention.
Figure 2:
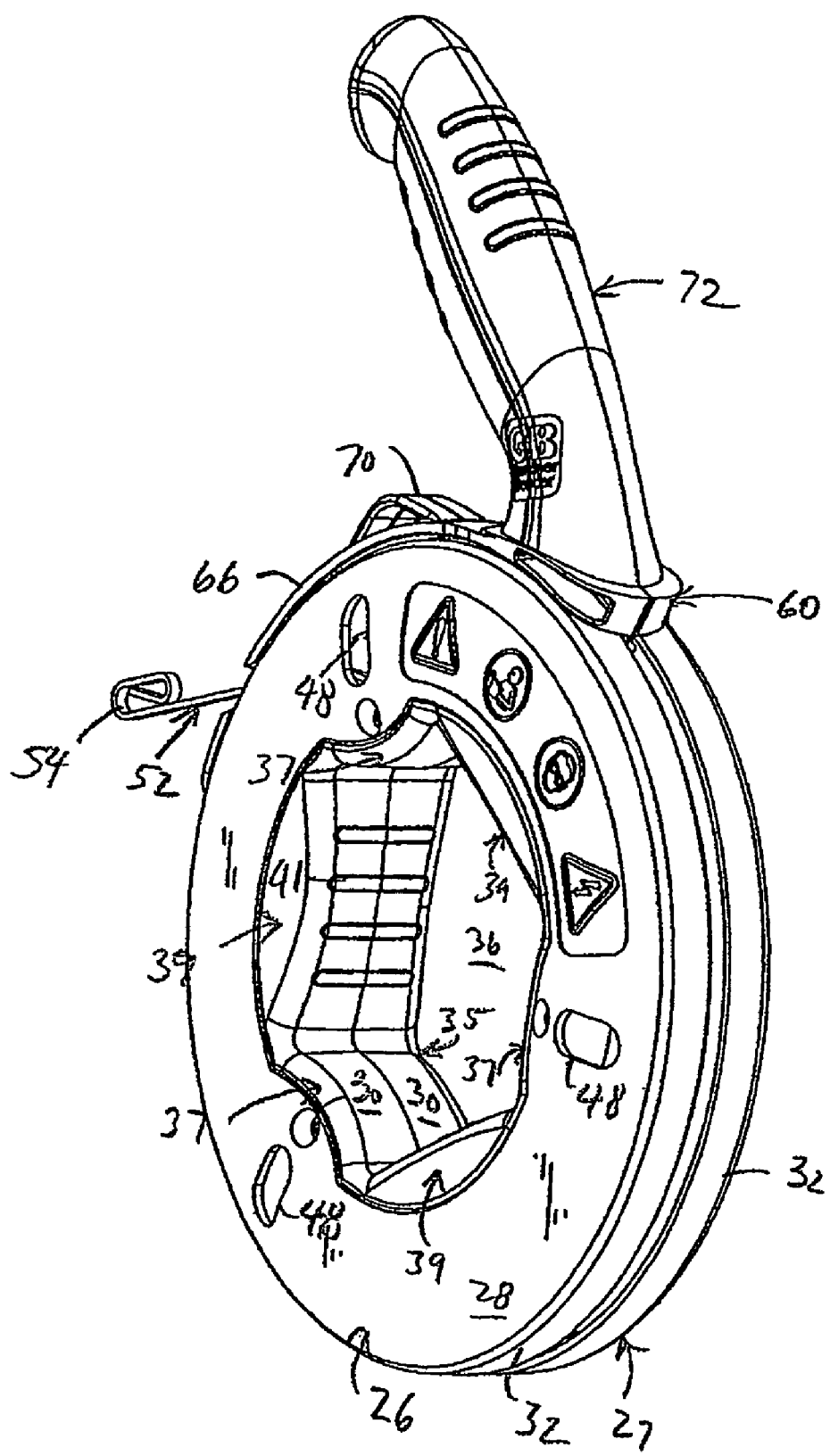
FIG. 2 is a rear perspective view thereof.
Figure 3:
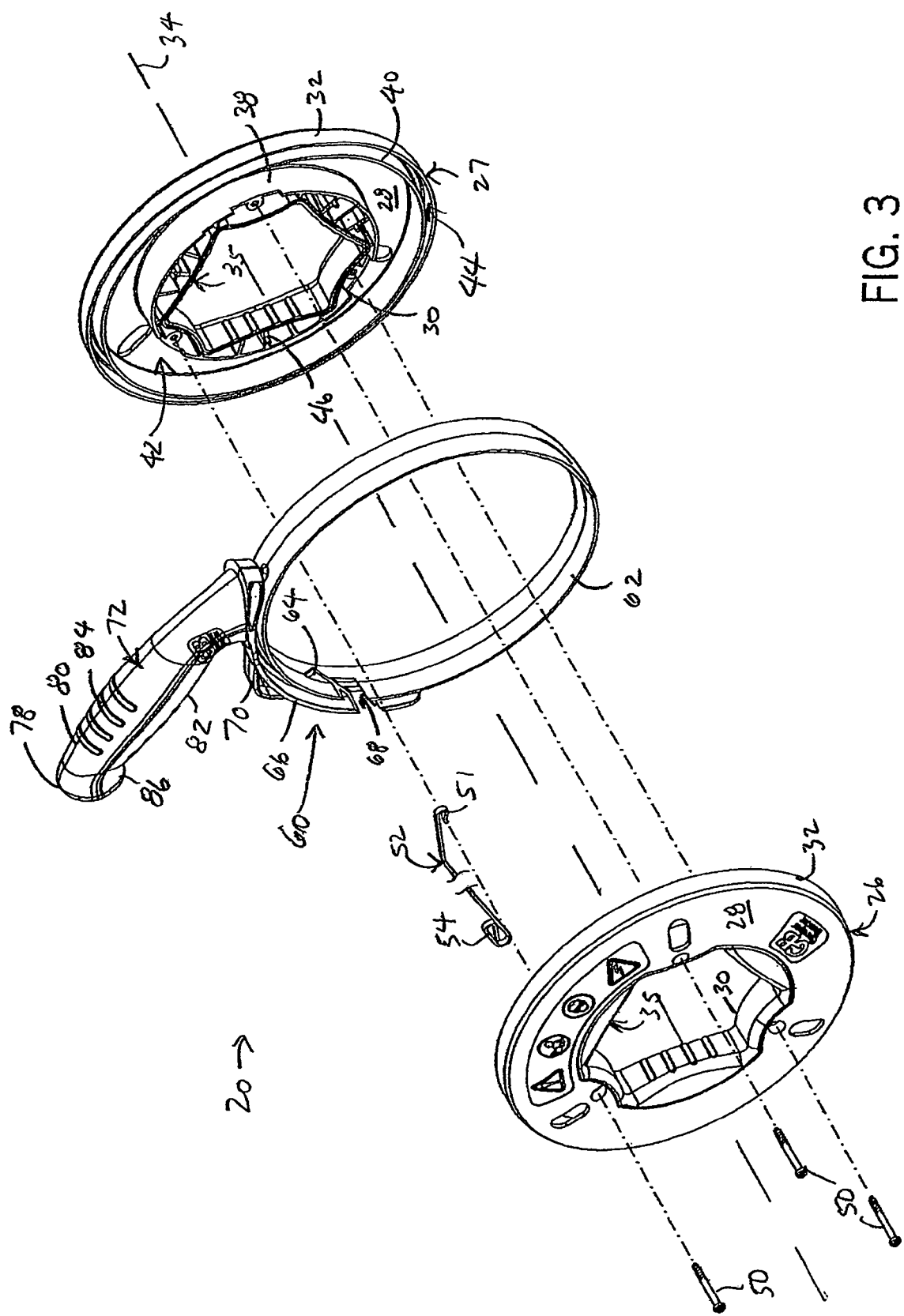
FIG. 3 is an exploded perspective view thereof.

The drawings referenced herein illustrate a preferred version of a fish tape reel assembly 20. Referring to FIGS. 1-5, the reel assembly 20 includes a reel housing 24 having two annular housing parts 26 and 27 made of a rigid plastic, such as nylon or polypropylene, using any suitable molding technique, such as injection molding. The housing parts 26 and 27 each have a convex annular wall 28 that tapers from an inner peripheral wall 30, configured as discussed in detail below, to a circular outer peripheral wall 32. The housing parts 26 and 27 are concentric about a center axis 34 passing through the middle of a center opening 36 defined by the inner peripheral wall 30. When the housing parts 26 and 27 are joined, the inner peripheral walls 30 define an inner periphery 35 with three convex hand stops 37 spaced equally about the center axis 34 and interposed between three equally spaced convex inner hand grips 39 of a larger radius than the stops 37. Preferably, the inner periphery 35 is overmolded with a tactile rubber or elastomer material for improved grip and comfort.

The interior of each housing part 26 and 27 is also formed with two interior circular walls 38 and 40. The interior walls 38 and 40 divide the interior of the housing 24 (when the housing parts 26 and 27 are joined) into an annular cavity 42 between the interior walls 38 and 40 and an annular groove 44 between interior wall 40 and the outer peripheral wall 32. Rib structures 46 extend between the inner peripheral wall 30 and interior wall 38 to support these walls with less material than if this area was solid. Each annular wall 28 has three oblong openings or windows 48, spaced equally about the center axis 34, that allow visual inspection inside the annular cavity 42 where three threaded fasteners 50 extend to join the housing parts 26 and 27 together.

Figure 7:
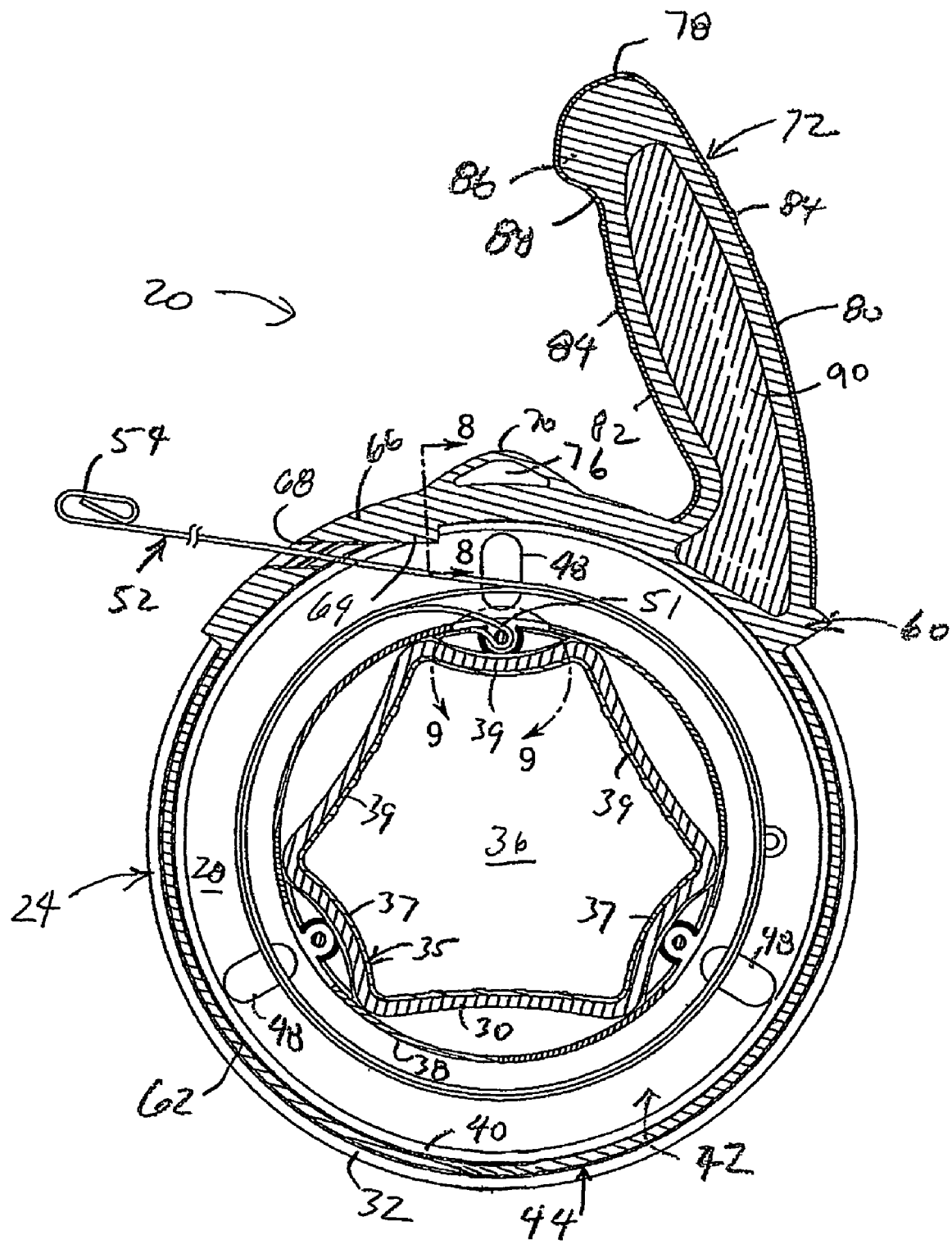
FIG. 7 is a side sectional view taken along line 7-7 of FIG. 5.
Figure 8:
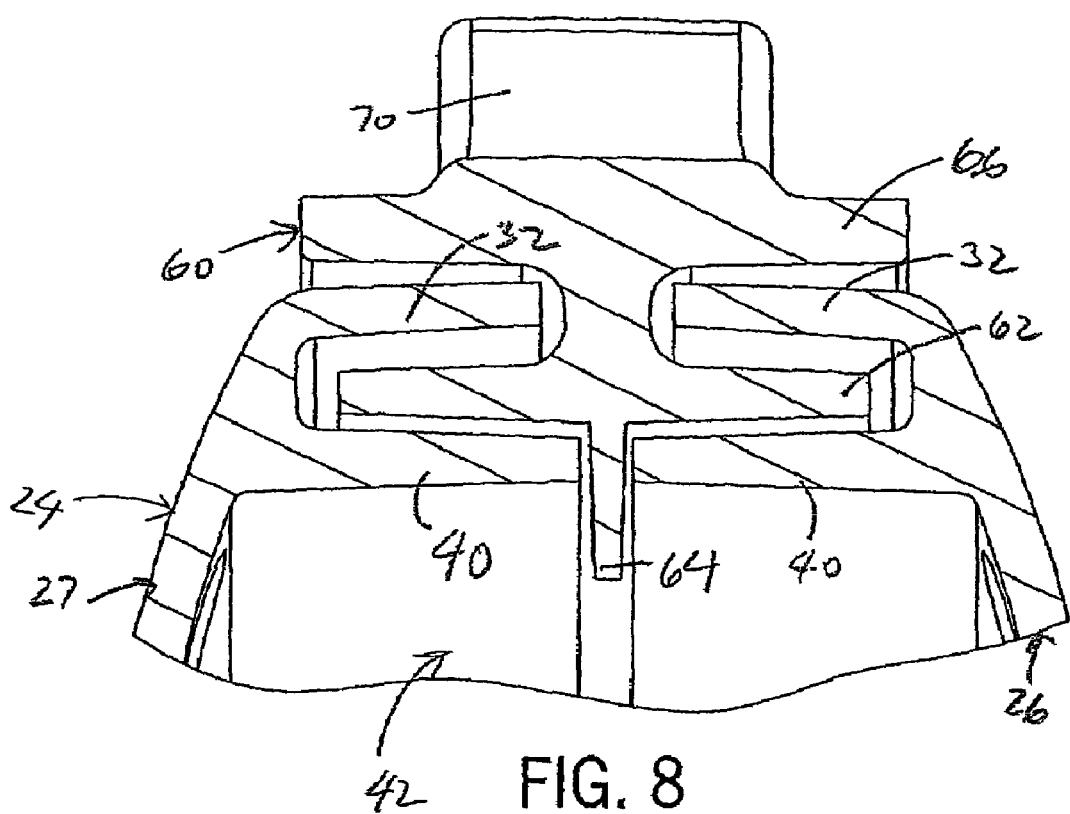
FIG. 8 is an enlarged partial sectional view taken along line 8-8 of FIG. 7.
Figure 9:
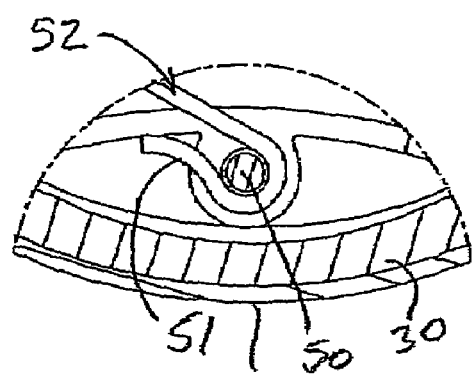
FIG. 9 is an enlarged partial sectional view taken along arc 9-9 of FIG. 7.
Figure 11:
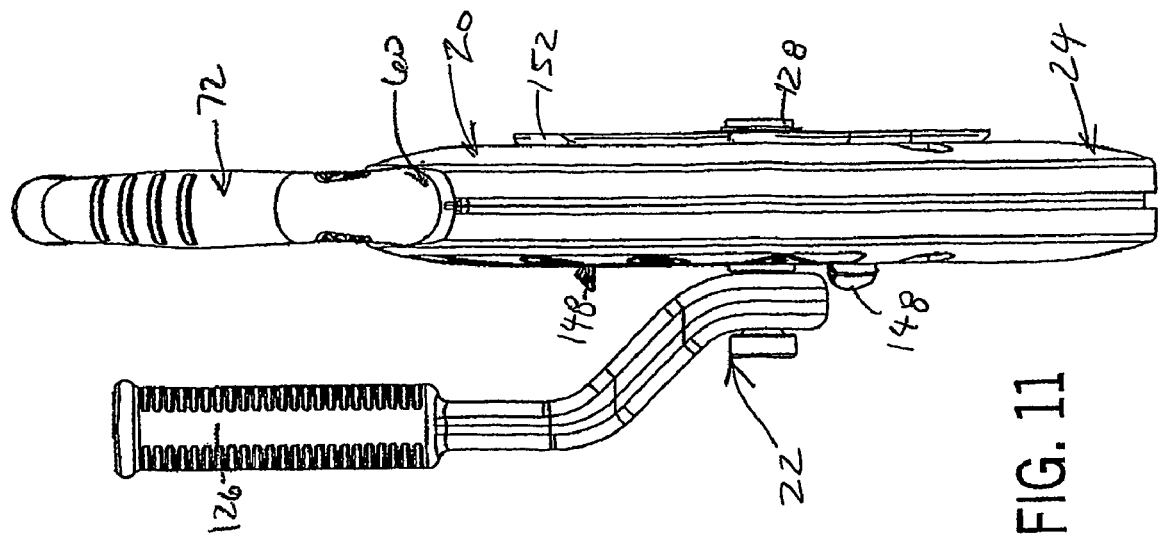
Figure 10:
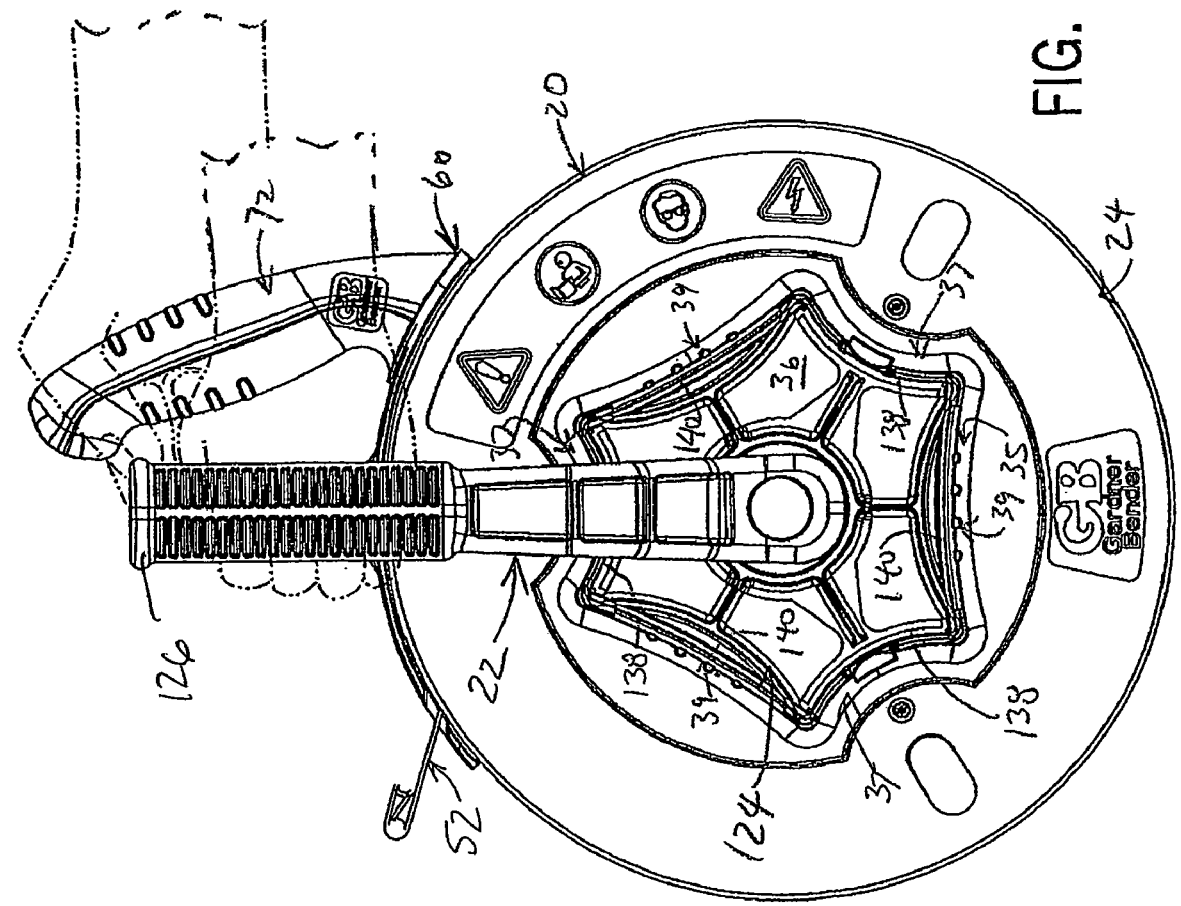
FIG. 10 is a side plan view of the fish tape reel assembly and a manual winder mechanism.
Figure 12:
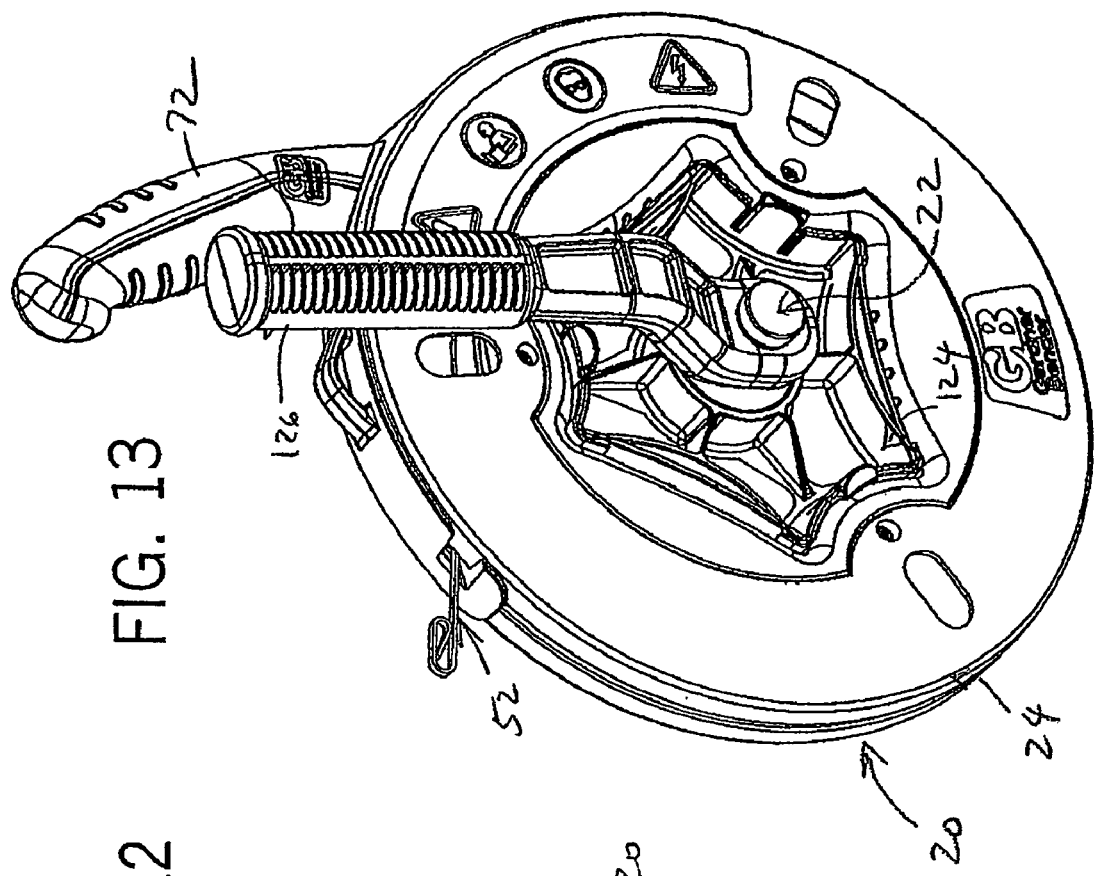
FIG. 12 is one perspective view thereof.
Figure 13:
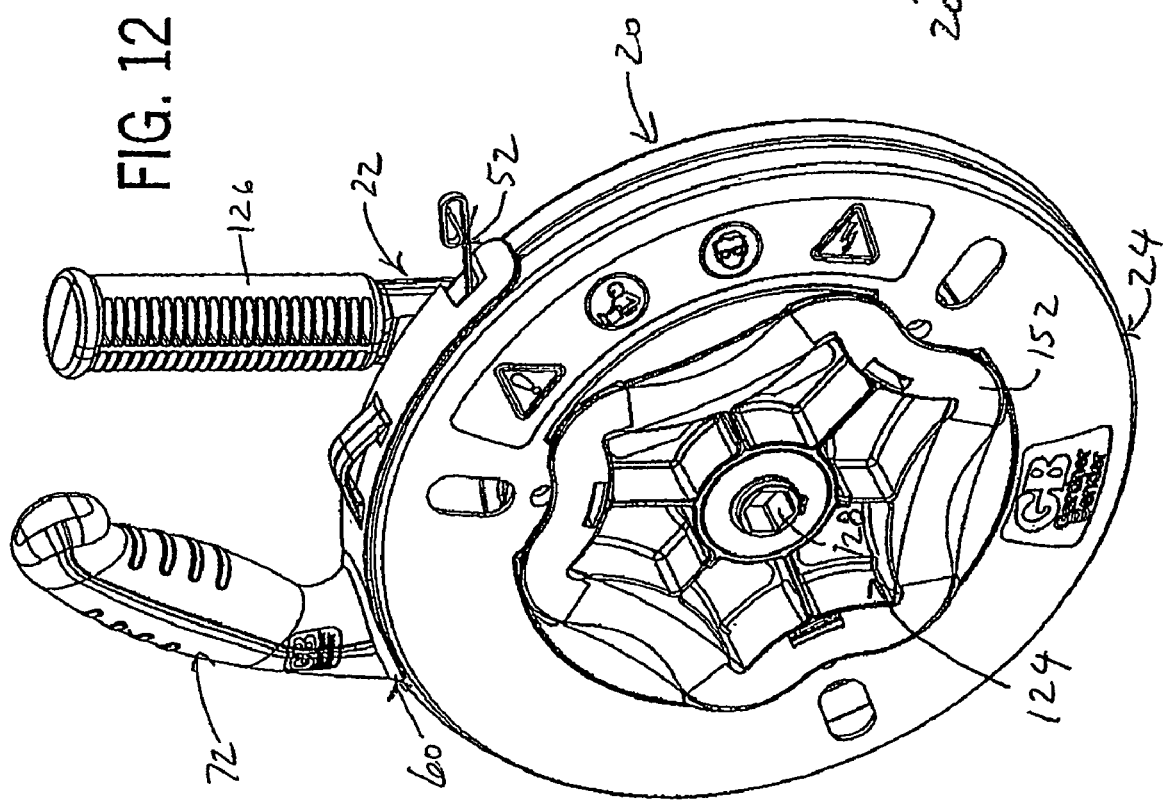
FIG. 13 is another perspective view thereof.

Referring to FIG. 7, the annular cavity 42 contains a coil of fish tape 52. The fish tape 52 is preferably an elongated flat metal or fiberglass tape wrapped about the interior wall 38. Although a flat tape is preferred, any shaped tape, such as a round tape, may be used without departing from the scope of the present invention. As shown in FIGS. 7 and 9, an anchor end 51 of the fish tape 52 is bent backward in a "U" or hairpin shape and looped around one of the fasteners 50 to anchor the fish tape 52 to the housing 24. The fish tape 52 is preferably assembled and anchored to the housing 24 after the two housing parts 26 and 27 are bolted together. The windows 48 allow the assembler a clear view of the fasteners 50 to facilitate in anchoring the fish tape 52. A free end 54 of the fish tape 52 extends from between the two housing parts 26 and 27 to the outside of the reel housing 24. The free end 54 is preferably bent back, as shown, or mounts an enlarged end piece (not shown) to prevent the free end 54 from entering the interior of the housing 24.

Referring now to FIGS. 1, 3 and 6-8, the reel housing 24 is held by a specially designed reel handle 60 that allows the reel housing 24 to be rotated about the center axis 34. The reel handle 60 has a shoe 62, that is generally a split ring or arcuate band slidably captured between the housing parts 26 and 27 within the annular groove 44 so as to be isolated from the fish tape 52 within the annular cavity 42. Preferably, the shoe 62 forms a continuous band which significantly improves its overall strength, and particularly its drop strength, so that the shoe is less likely to be damaged by impact to the reel housing 24 or reel handle 60. Depending inwardly from the shoe 62 is a small keel feature 64 (shown best in FIG. 8), which spaces apart the housing parts 26 and 27 when bolted together to provide a gap for the fish tape 52 to pass through from the annular cavity 42. The keel 64 may be partially worn down (so as not to extend into the annular cavity 42) by friction from contact with the fish tape 52 during initial assembly in which an automated high speed winder (as known in the art) is used to coil the fish tape 52 inside the annular cavity 42.

The reel handle 60 has an exterior section 66 at the top of the reel assembly 20 that defines an exit aperture 68 and a hanger 70 and from which extends a pistol grip 72. The exit aperture 68 is an opening or passageway that extends generally tangentially from the annular cavity 42 to guide the fish tape 52 along the intended feed direction, which is essentially perpendicular to a vertical center line 74 passing vertically through the middle of the hanger 70. The exit aperture 68 is located toward a forward side (left in FIG. 7) of the center line 74. The hanger 70 simply forms a bounded opening 76 sized for a nail or conventional peg board hook so that the reel assembly 20 can be suspended from a wall or a display rack.

Figure 4:
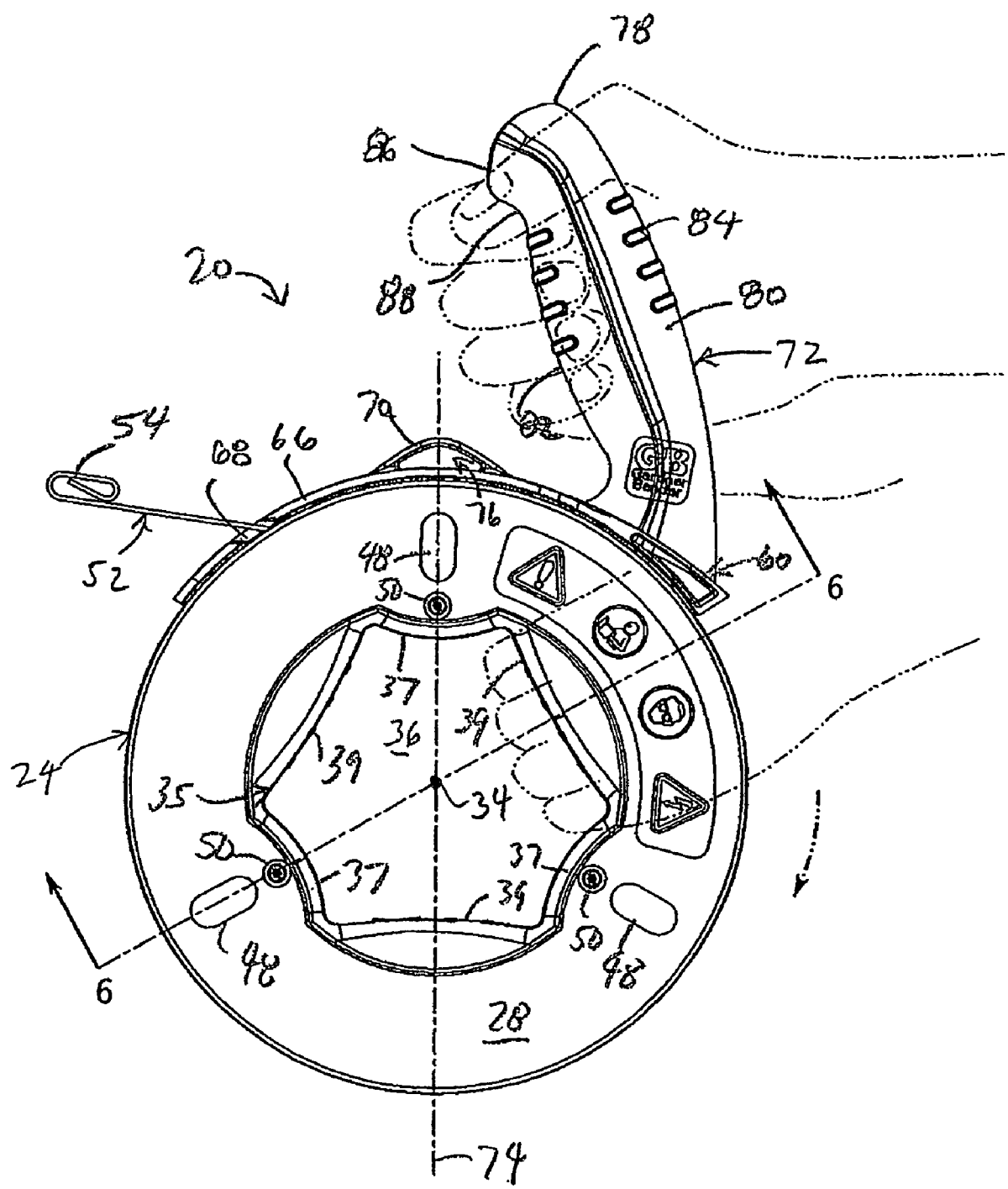
FIG. 4 is a side plan view thereof.

The pistol grip 72 is located at a rear or aft side of the center line 74, opposite that of the exit aperture 68. The pistol grip 72 leans forward from its base and extends generally tangentially, at an angle less than 90 degrees, from the housing 24 to a free end 78, which preferably remains behind the center line 74 (as shown in FIG. 4). The pistol grip 72 is generally oblong in cross-section and forms a convex palm rest 80 and a convex finger grip 82. Raised lateral ribs 84 are formed in these areas to improve the grip. A head 86 at the free end 72 of the pistol grip 72 hooks over the user's index finger which is cupped in a concave surface 88 adjacent to the finger grip 82. The length of the pistol grip 72 is preferably sufficient to allow it to be grasped comfortably between all four fingers and the palm. This distance is generally about 4-5 inches and preferably at least about 3 inches. For added strength, the pistol grip 72 may be molded about a steel plate 90 (see FIG. 7), and for added comfort and tactility, the pistol grip 72 may be overmolded with a rubber or elastomer.

The contour, length and location on the housing 24 all contribute to making the pistol grip 72 ergonomic and comfortable to hold when using the reel assembly 20. The rearward location of the pistol grip 72 allows the reel assembly 20 to be oriented as shown in FIG. 4 when held by the pistol grip 72. In this orientation, the user grasping the pistol grip 72 with one hand can support the reel assembly 20 with a straight wrist and forearm, generally parallel to the horizon and to the generally horizontal feed direction of the fish tape 52. This reduces strain on the wrist and hand because in this orientation the reel assembly 20 does not tend to bend back the user's wrist. In fact, the pistol grip 72 is oriented so that the weight of the reel assembly is balanced such that a user grasping the pistol grip 72 will have his wrist essentially straightened and horizontal in a neutral balanced position of the pistol grip 72, as shown in FIG. 4. Moreover, the fish tape 52 is wound into the reel housing 24 (in a clockwise direction in FIG. 4) such that the force required to wind the fish tape 52 will tend to seat the palm rest 80 of the pistol grip 72 straight back against the user's palm, which helps the user to maintain a firm grip without undue strain. Also, guiding the fish tape 52 along a feed direction substantially perpendicular to the center line and parallel to the ground and the user's forearm reduces twisting and strain on the user's hand and wrist.

The reel assembly 20 is operated, preferably by grasping the pistol grip 72 and holding the reel assembly 20 generally stationary with the wrist held straight and the forearm parallel to the ground, for example with a right hand. And, with the other hand, the free end of the fish tape 52 is pulled along the feed direction away from the reel housing 24 and guided along the desired path. The fish tape 52 is wound back into the annular cavity 42 of the reel housing 24 by putting the free hand within the center opening 36 and grasping one of the hand grips 39. Holding onto one of the grips 39 and moving the housing 24 in a circular clockwise path (as shown in FIG. 4) about the center axis 34 winds the fish tape 52. Preferably, the hand grip 39 near the top middle of the reel housing 24 would be grasped and rotated downward and toward the user's body preferably in the range of 90 to 150 degrees, and more preferably about 120 degrees, about the center axis 34. Then, after that stroke is completed, the user would grasp another grip at the top middle of the reel housing 24 and rotate it again, repeating this as necessary until the fish tape 52 is wound completely, or as far as desired, within the reel housing 24.

Note that the user need not grasp the hand grips 39 with much force since the stops 37 at the inner periphery 35 will abut the bottom side of the user's hand (from which the user's little finger extends) and thereby assist in engaging the user's hand and the reel housing 24. The overmold and the convex contour of the reel housing 24 also improve the comfort and ergonomics at the inner grips 39. Moreover, the convex shape of the annular walls 28 of the housing increase the capacity (around 25-30 percent over straight walled reel housings) of the annular cavity 42, which can hold 50, 100 or 200 feet of fish tape 52 depending on the overall diameter of the reel housing 24, without making the grips 39 too wide to be comfortable.

The reel assembly 20 can be used with a manual winder mechanism 22 as an alternative to winding the fish tape by grasping the inner grips 39. The winder mechanism 22 is described in detail in co-pending application entitled "Fish Tape Winder" co-owned by the assignee of the present invention and hereby incorporated by reference as though fully set forth herein. The winder mechanism 22 will now be described only briefly now.

Referring now to FIGS. 10-13, the winder mechanism 22 includes a plastic hub 124, a plastic winder handle 126, a steel shaft 128 and a roller clutch (not shown). All of these components are assembled so as to be disposed along and/or concentric the center axis 34, shown in FIG. 3.

As shown, the winder 22 fits into the center opening 36 of the reel assembly 22 from one side so that the hub 124 is disposed inside the inner periphery 35 of the reel assembly 20 such that concave sprocket sections 138 cup the convex stops 37 and concave spanning sections 140 cup the inner grips 39. A peripheral flange 152 of the hub 124 will abut the side of housing part 27 and spring tabs 148 will "snap" over and dip onto an edge of the inner periphery 35 at the opposite housing part 26 to retain the winder 22 to the reel assembly 20.

The fish tape reel and winder assembly is preferably used by manually pulling the free end of the fish tape 52 away from the reel assembly 20 to unwind the desired length of fish tape 52, which is guided along the desired path. The fish tape 52 is wound back within the reel assembly 20 by grasping the pistol grip 72 and holding the reel assembly 20 generally stationary with the wrist held straight and the forearm parallel to the ground. Then, the user pulls back on the winder handle 126 with the other hand, moving it in a circular path toward the user's body at the top of the stroke, counterclockwise in the drawings, so as to rotate the housing 24 this direction. Since the fish tape 52 is anchored to the housing 24 this action winds the fish tape 52 inside the annular cavity 42 (see FIG. 9) of the reel assembly 20. The stroke travel of the winder handle 126 is preferably about 120 degrees and then ratcheted back in the opposite rotational direction, which disengages the roller clutch (not shown) so it does not rotate the reel assembly housing 24 with respect to the reel handle 60.

Figure 14:
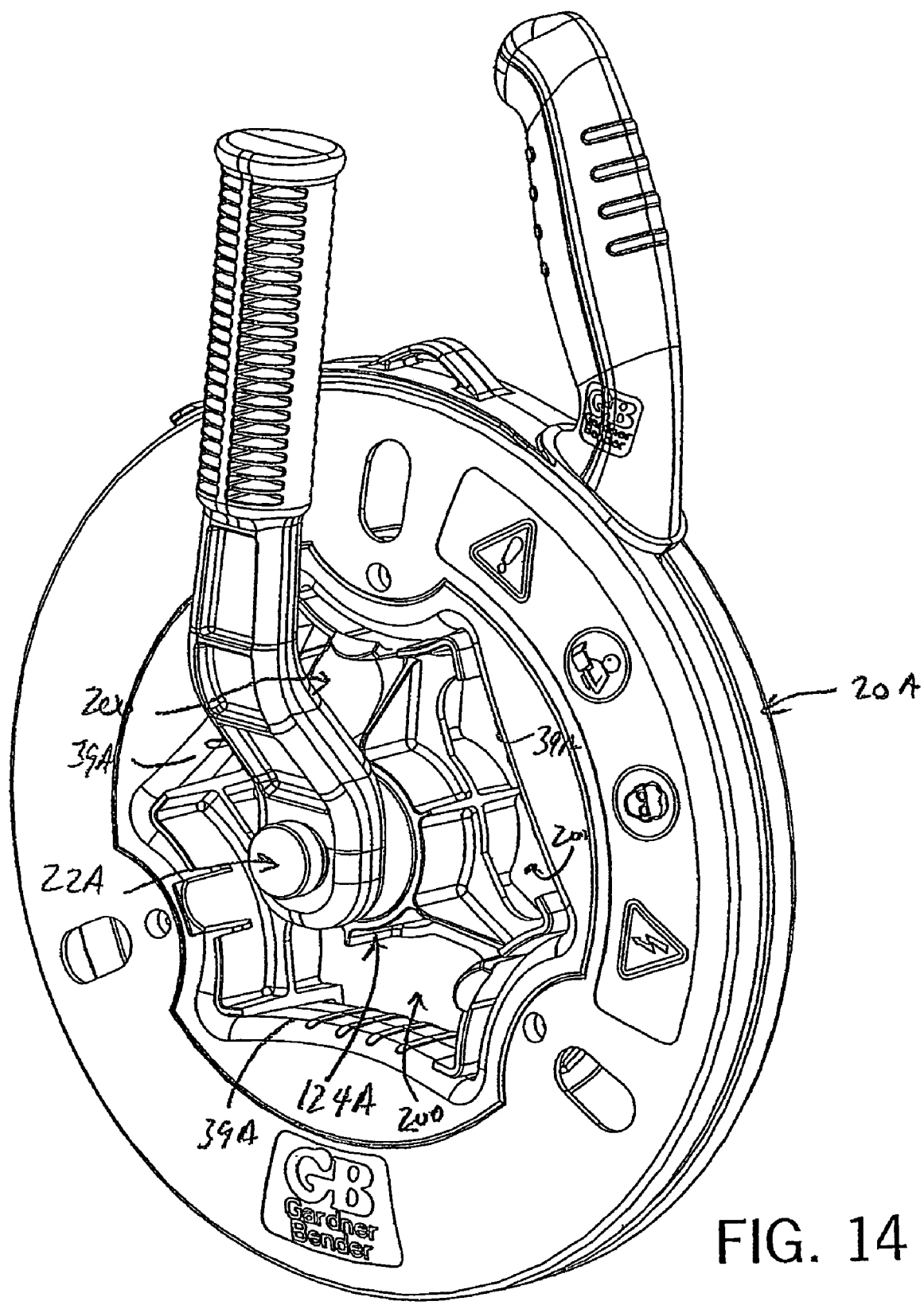
FIG. 14 is a rear perspective view of the fish tape reel assembly and another embodiment of the winder in which the hub defines openings that allow the user to manually grasp grips at the inner periphery of the reel assembly.

FIG. 14 shows an alternate embodiment of the winder mechanism 22A including the same components as described above except that the hub 124A has a different configuration designed to provide openings 200 allowing the user to grasp hand grips 39A of the reel assembly 22A without removing the winder 22A from the reel assembly 20A.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. A fish tape reel assembly disposed about a center axis and lying along first and second sides of a center line intersecting and extending perpendicularly to the center axis, the assembly comprising:
    a housing defining a cavity concentric about the center axis and disposed between an outer periphery of the housing and inner periphery of the housing which defines a central opening through which the center axis extends;
    a handle member having a retainer shoe captured within the housing so as to be rotatable about the center axis with respect to the housing, the handle member defining an exit aperture on a first side of the center line in communication with the cavity and a pistol grip on a second side of the center line, the pistol grip being oriented so that the weight of the reel assembly is balanced such that a user grasping the pistol grip will have the user's wrist essentially straightened and horizontal in a neutral balanced position of the pistol grip; and
    a fish tape wound within the cavity and having one end fixed to the housing and an opposite end extending outside of the housing, wherein the fish tape is wound within the cavity by rotating the housing about the center axis with respect to the handle member;
    wherein the inner periphery of the housing defines a plurality of convex hand grips having raised ribs.

2. The fish tape reel assembly of claim 1, wherein the pistol grip extends from the second side of the center line at an angle less then ninety degrees from a tangent line intersecting the pistol grip and the housing.

3. The fish tape reel assembly of claim 1, wherein the pistol grip extends at least about three inches to a free end.

4. The fish tape reel assembly of claim 1, wherein the pistol grip defines a convex palm rest and a convex finger grip.

5. The fish tape reel assembly of claim 4, wherein the convex finger and palm rests have raised ribs.

6. The fish tape reel assembly of claim 4, wherein the pistol grip defines a contoured head at a free end for engaging a user's index finger.

7. The fish tape reel assembly of claim 1, wherein the housing defines a circular peripheral groove radially outside of the cavity in which the retainer shoe of the handle member is disposed such that the retainer shoe is isolated from the fish tape other than at the exit aperture.

8. The fish tape reel assembly of claim 7, wherein the retainer shoe is an arcuate band.

9. The fish tape reel assembly of claim 8, wherein the retainer shoe forms a continuous band.

10. The fish tape reel assembly of claim 1, wherein the housing defines a convex outer surface between the inner and outer peripheries.

11. The fish tape reel assembly of claim 1, wherein the housing includes two annular housing parts connected by threaded fasteners.

12. The fish tape reel assembly of claim 1, wherein the inner periphery defines three hand grips spaced apart 120 degrees about the center axis.

13. The fish tape reel assembly of claim 12, wherein the hand grips are each at least about three inches in length.

14. The fish tape reel assembly of claim 12, wherein the inner periphery also defines a hand stop adjacent the hand grip for physical abutment with one's hand during winding.

15. The fish tape reel assembly of claim 1, wherein the fixed end of the fish tape wraps around an axial pin element within the housing.

16. The fish tape reel assembly of claim 15, wherein the pin element is a threaded fastener joining two annular housing segments defining the cavity.

17. The fish tape reel assembly of claim 1, in which the fish tape is a flat metal strip.

18. The fish tape reel assembly of claim 1, further including a hanger at one of the housing and the handle member.

19. The fish tape reel assembly of claim 18, wherein the hanger is intersected by the center line.

20. The fish tape reel assembly of claim 1, further including a winder mechanism having a hub adapted to engage the inner periphery of the housing and having a winder handle adapted to rotate the hub and thereby the housing about the center axis relative to the handle member for winding the fish tape within the cavity.

21. A fish tape apparatus, comprising:
    a reel assembly, including:
    a housing defining a cavity concentric with a center axis and disposed between an outer periphery of the housing and inner periphery of the housing which defines a central opening through which the center axis extends;
    a handle member rotatable about the center axis with respect to the housing and having a pistol grip extending from the housing;

a fish tape wound within the cavity and having one end fixed to the housing and an opposite end extending through an exit aperture to the outside of the housing; and a winder mechanism having a hub adapted to engage the inner periphery of the housing and having a handle adapted to rotate the hub and thereby the housing about the center axis relative to the handle member for winding the fish tape within the cavity, wherein the winder mechanism includes a clutch such that rotating the winder handle in one direction rotates the housing with respect to the handle member to wind the fish tape and rotating the winder handle in an opposite direction does not cause the housing to rotate relative to the handle member.

22. The fish tape apparatus of claim 21, wherein the clutch is a drawn cup roller clutch.

23. The fish tape apparatus of claim 21, wherein the winder mechanism is removably mounted at the inner periphery of the reel assembly housing.

24. The fish tape apparatus of claim 21, wherein the hub of the winder mechanism is spaced from a hand grip at the inner periphery of the reel assembly housing.

25. The fish tape apparatus of claim 21, wherein the pistol grip extends to a free end at one side of a center line perpendicular to and intersecting the center axis.

\* \* \* \* \*